United States Patent Office 3,072,597
Patented Jan. 8, 1963

3,072,597
COMPOSITION COMPRISING A POLYVINYL ACETAL, A MELAMINE-ALDEHYDE RESIN, A POLYURETHANE AND, AS A CURE PROMOTER, AN ORGANIC COMPOUND OF TIN OR IRON, AND ELECTRICAL CONDUCTOR COATED THEREWITH
Edward Lavin, Longmeadow, Albert H. Markhart, Wilbraham, and Charles F. Hunt, Springfield, Mass., assignors to Shawinigan Resins Corporation, Springfield, Mass., a corporation of Massachusetts
No Drawing. Filed Mar. 14, 1960, Ser. No. 14,538
16 Claims. (Cl. 260—45.2)

This invention relates to polyvinyl acetal compositions especially adapted to serve as electrical insulation for metals. More particularly, the invention relates to compositions of polyvinyl acetals with certain polyurethanes and melamine resins, which compositions having improved curability characteristics, and to wires coated with the cured compositions.

The heat-cured products of polyvinyl acetal resins modified with certain polyurethanes and melamine resins have been found to provide excellent electrical insulation. Such polyvinyl acetal compositions are disclosed in the application of Edward Lavin and Albert H. Markhart, Serial No. 823,342, filed June 29, 1959. Those compositions comprise 100 parts polyvinyl acetal, 20–200 parts of a polyurethane and 0.5–20 parts of a melamine resin, said compositions possessing good flexibility, abrasion resistance, thermal stability, and improved resistance to organic solvents especially refrigerants, for example, monochlorodifluoromethane.

Although the above mentioned compositions have improved the quality of a polyvinyl acetal type electrical insulation, the curability characteristics of the compositions still present difficulty. Because the rate of cure varies for the particular resinous components of the composition, it has been found that the range of curing conditions for all of the included compositions is a relatively narrow one. In addition, the optimum cure temperatures for the compositions are higher than for the commonly employed polyvinyl acetals modified with phenol-aldehyde resins, and also the required cure period found to be more extensive. Since all of these factors increase the cost of insulation to the user, this naturally restricts the sale thereof, despite the desirable properties achieved with the cured composition. We have discovered that the addition of a further modifying agent to these compositions materially increases the curing range and accordingly permits the cured products to be made at a considerably lower cost than heretofore possible. Another unexpected benefit resulting from the addition of the cure promoter to the system has been the improvement in the solvent resistance of the cured coating.

Our invention, stated briefly, is a modified polyvinyl acetal composition comprising 100 parts polyvinyl acetal, 5–200 parts polyurethane, 0.5–20 parts of a melamine resin, and 0.01–2 parts of a cure promotor. Effective cure promoters comprise particular soluble metal organic compounds selected from the group containing tin and/or iron. It has also been discovered that the addition of particular amines namely, tertiary amines in combination with the named cure promoters, produces a further improvement of the monochlorodifluoromethane solvent resistance.

This invention is illustrated in its preferred embodiment in the following examples and subsequent discussions thereon, but is not limited thereto. Where parts and percentages are shown hereinafter in the specification and in the claims, they are parts and percentages by weight unless otherwise specified.

EXAMPLE 1

A polyvinyl formal resin was used having the following analysis:

10½% acetate groups calculated as polyvinyl acetate
6% hydroxyl groups calculated as polyvinyl alcohol
83½% formal groups calculated as polyvinyl formal (by difference)

100 parts of the above resin together with 60 parts of a polyurethane represented by the formula:

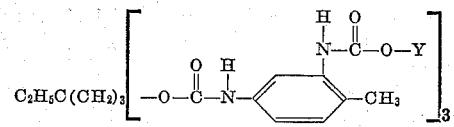

where Y is a phenyl group, along with 5 parts of a melamine-formaldehyde condensate resin added as a 67% solution in xylene, and 0.12 part dibutyltin dilaurate were added to a solvent mixture comprising 430 parts of naphtha and 255 parts of cresylic acid. The resin additions were made in a suitable container at room temperature with moderate agitation. An amber colored solution was obtained having a total solids of approximately 18% and a viscosity of 5500 centipoises at 25° C.

Six coats of this enamel were applied to No. 18 magnet wire by running the wire through the solution, by conventional means. After each coating, the wire was passed through a vertical oven 12 feet high for curing, the hottest portion of the oven being approximately 4 feet long and having a temperature of about 350° C. The increase in thickness of the wire due to the insulative coating was approximately 3 mils total build. The enameled wires were cured at different travel speeds of the wire through the vertical oven to demonstrate the range of cure possible for the present compositions. The results of tests on the properties of the cured products, along with like results for comparison of cured products not containing the cure promoters are shown in Table I below:

Table I

|  | With Cure Promoter | | | | Without Cure Promoter | | |
|---|---|---|---|---|---|---|---|
| Speed, ft./min | 12 | 14 | 16 | 18 | 12 | 14 | 16 |
| Build, mils | 2.8 | 2.9 | 3.0 | 3.0 | 2.8 | 3.0 | 3.1 |
| Toluene-MeOH-extractibles (percent) | 1.1 | 0.5 | 0.5 | 0.7 | 1.8 | 0.9 | 0.7 |
| Monochlorodifluoromethane extractibles (percent) | 0.7 | 0.4 | 0.5 | 0.7 | 1.3 | 1.4 | 0.5 |

It can be seen from the above results that the solvent resistance obtained for the composition of Example 1 as measured by the toluene-methanol extractibles and monochlorodifluoromethane extractibles over cure speeds ranging from 14 to 18 feet per minute is not obtained in the cured compositions without the cure promoter except at the travel speed of 16 feet per minute.

EXAMPLE 2

To illustrate the similar effects of the cure promoter upon other compositions of the present invention, 2 parts dibutyltin diacetate were added to an 18 percent solids wire enamel containing the resinous materials of Example 1 in the proportions of 100 parts polyvinyl acetal, 45 parts polyurethane and 7.5 parts melamine-formaldehyde condensate resin. Thereafter enameled wires were prepared according to the method described in Example 1 and a comparison of the monochlorodifluoromethane extractibles with a like composition not containing the cure promoter resulted in the same improvement reported in that example.

EXAMPLE 3

To illustrate the improvement in monochlorodifluoromethane resistance of the cured compositions containing a tertiary amine as well as the cure promoter, enameled wires were prepared according to Example 1 except that 0.10 part of an equi-part mixture of iron naphthanate and triethylenediamine was substituted for the 0.12 part dibutyltin dilaurate used therein. The monochlorodifluoromethane extractibles for the heat-cured products were measurably lower than for like products containing the iron naphthanate but not containing the triethylenediamine.

The tests of the properties reported in Examples 1-3 were made in the following manner:

*Toluene-methanol extractibles.*—Weighed specimens are immersed successively in boiling reagent grade toluene and reagent grade methanol for a period of 2 hours' immersion in each solvent. The samples are then dried and re-weighed, whereupon the amount of coating which has been extracted during successive immersions is calculated and reported on a percentage loss basis.

*Monochlorodifluoromethane extractibles.* — Weighed specimens are immersed in the liquid refrigerant for a period of 16 hours. The immersion is conducted in a bomb in order to keep the normally gaseous refrigerant in a liquid state, and the test conditions for the bomb are 205–240 p.s.i. and 37–43° C. The test specimens are removed after the immersion period, dried and re-weighed. The amount of extractibles obtained from the coating is calculated on a percentage weight loss basis.

The cured products of this invention are the solid reaction products of 100 parts by weight of a polyvinyl acetal, 5–200 parts of a polyurethane, 0.5–20 parts of a melamine-aldehyde resin, and 0.01–2 parts of a cure promoter selected from the class of soluble metal organic compounds of tin and iron optionally, even further improved results can be obtained by the incorporation of a tertiary amine in the composition in the same parts range used for the cure promoter. For the best balance of properties required for wire coating compositions, the preferred composition comprises 100 parts of polyvinyl formal, 40–80 parts of the polyurethane, 1–10 parts of the melamine-aldehyde condensate resin, and 0.03–0.5 part each of the cure promoter and a tertiary amine.

The cure promoter of the present invention can be selected from the general class of metal organic compounds of tin and iron which are soluble in the solvents employed for the preparation of the wire enamels. Suitable metal organic compounds include the organic acid salts of tin and iron, tetrabutyltin, and dibutyltin oxide. The most effective cure promoters have been found to be the organic acid salts of tin and iron. Useful cure promoters from the preferred class of tin and iron salts include both the lower and higher valance form of the metallic ions and in addition to the salts disclosed in the preceding examples include stannous octoate, ferric acetate, ferric octoate, ferric naphthanate and ferric laurate.

In order to be utilizable in the practice of the present invention, the tertiary amines must also be soluble in the solvents employed for the preparation of the wire enamels. Suitable tertiary amines, in addition to the triethylenediamine employed in Example 3, include N-methylmorpholine as well as N-ethylmorpholine, N-N'-dimethylpiperazine and tributylamine.

The polyurethane materials of this invention are adducts of organic polyisocyanates having the isocyanate groups reacted with the reactive hydrogen of another organic compound. The adduct portion of the polyurethane is removed by the elevated temperatures of the cure reaction, permitting the remaining polyisocyanate to crosslink the resinous composition. Suitable polyisocyanates include compounds such as phenylene diisocyanates, diphenylene diisocyanates, tolylene diisocyanates, naphthylene diisocyanates, diphenylmethane diisocyanates, cyclohexane diisocyanates, ethylene diisocyanate, tetramethylene diisocyanate, hexamethylene diisocyanate, polyaryl polyisocyanates, trimers of polyisocyanates, polyisocyanates which are the reaction porducts of diisocyanates or triisocyanates with polyhydric alcohols, and the like, and mixtures, trimers and isomers thereof. The simplest class of useful polyisocyanates can be represented with the following formula:

$$R(-N=C=O)_n$$

where R represents a member of the class consising of aliphatic hydrocarbons containing up to 8 carbon atoms, aromatic hydrocarbons containing up to 13 carbon atoms, alicylic hydrocarbons containing up to 6 carbon atoms, and alkyl-aryl substitutes thereof, and $n$ is an integer from 2–4. Typical trimers of the useful polyisocyanates can be illustrated by the following general formula:

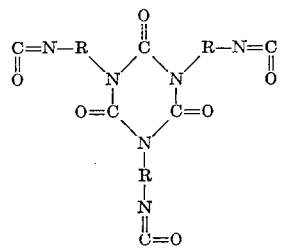

where R is the same as defined in the above formula for the polyisocyanates. Typical examples of the reaction products of polyisocyanates with polyhydric alcohols can be illustrated by the following general formula:

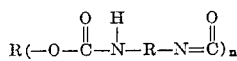

where R is the same as defined in the above formula for the polyisocyanates and $n$ is an integer from 2–10. Suitable reactive hydrogen containing compounds combining with the polyisocyanates to form the desired polyurethanes include phenols such as phenol, cresol, xylenols, etc., secondary aromatic amines, alcohols (mono and poly functional), amides, lactams, mercaptans, enols and the like. Mixtures thereof can also be used to block the polyisocyanates. The preferred blocking agents are compounds with the hydroxyl group attached to the aromatic ring.

The preferred polyurethanes may be prepared by reacting the monohydric phenol with the reaction product of a polyhydric alcohol and an arylene diisocyanate. The polyhydric alcohols are in general preferably limited to compounds containing not more than 16 carbon atoms. For use in wire enamels, the polyhydric alcohols should contain preferably not more than 10 carbon atoms. Examples of these alcohols are ethylene glycol, propylene glycol, glycerol, trimethylol propane, pentaerythritol, one of the isomeric hexanetriols, etc. The monohydric phenol may be an aryl compound such as phenol, cresols, xylenols and ethyl phenol. This class of preferred polyurethanes can be represented by the general formula:

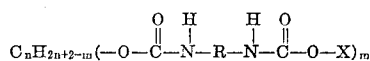

where R represents a member of the class consisting of phenylene, methylphenylene, dimethylphenylene, naphthylene and methylnaphthylene group, X represents a member of the class consisting of phenyl and alkyl phenyl groups, said alkyl groups containing 1–6 carbon atoms, $m$ is an integer greater than 1 but no greater than $n$, and $n$ is an integer from 2–10.

The polyvinyl acetals useful in this invention are obtained by reacting polyvinyl alcohol or a partially hydrolyzed polyvinyl ester with an aldehyde, especially formaldehyde. Polyvinyl acetals contain a certain number of hydroxyl groups and may contain a certain number of ester groups depending upon the extent of the hydrolysis and acetalization reactions. The preferred polyvinyl formal resins contain on a weight basis, 1–35% ester groups calculated as polyvinyl ester, 3–15% hydroxyl groups calculated as polyvinyl alcohol and the balance substantially formaldehyde acetal. In the commercial polyvinyl formals, the ester groups are acetate groups. Other polyvinyl acetals such as the reaction product of hydrolyzed polyvinyl esters with acetaldehyde, propionaldehyde, butyraldehyde and benzaldehyde, may also be reacted with the polyurethane of this invention.

The melamine resins which may be used in the present wire enamel compositions can be selected from the general class of resinous aldehyde condensation products of melamine which are soluble in the organic liquids employed as solvents for the resinous components of the enamel. The useful melamine compounds include such derivatives of melamine as melam and melem. The aldehyde condensation products are well known and may be formed by reacting from 1–6 mols of the aldehyde with 1 mol of melamine. The solubility of the aldehyde-melamine condensation product is generally obtained by further reacting the condensation product with an alcohol or by co-condensing the melamine and aldehyde in the presence of an alcohol.

The aldehydes which may be used are aliphatic, aromatic, cyclic and heterocyclic aldehydes including formaldehyde, acetaldehyde, propionaldehyde, butyraldehyde, isobutyraldehyde, valeraldehyde, octaldehyde, benzaldehyde, cinnamaldehyde, cyclohexanone, furfural, etc.

The alcohols which may be used include aliphatic, cycloaliphatic, aromatic, nitro, and amino alcohols such as methanol, ethanol, propanol, isopropanol, butanol, isobutanol, pentanols, octanols, lauryl alcohol, cetyl alcohol, stearyl alcohol, cyclohexanol, benzyl alcohol, cinnamyl alcohol, allyl alcohol, 2-nitro-1-butanol, 2-nitro-2-methyl-1-propanol, 2-nitro-2-methyl-1, 3-propane diol, 2-nitro-2-ethyl-1,3-propane diol, tris (hydroxy methyl) nitro methane, 2-amino-1-butanol, 2-amino-2-methyl-1-propanol, 2-amino-2-methyl-1, 3-propane diol, 2-amino-2-ethyl-1, 3-propane diol, tris (hydroxy methyl) amino methane etc. Mixtures of two or more alcohols may be used if desired. The amounts of alcohol reacted are generally equal to or in excess of the formaldehyde on a molar ratio.

The preferred melamine resins are the further reaction products of the melamine, aldehyde and alcohol reactants with an aryl sulfonamide. These products are also well known and may be obtained by co-condensation of all the reactants named such as taught in U.S. 2,508,875, which is hereby incorporated by reference. The useful aryl sulfonamides include benzene sulfonamide and the ring-substituted derivatives thereof, such as toluene sulfonamides, chlorobenzene sulfonamides, nitrobenzene sulfonamides, etc.

For reasons of economy and availability it is preferred to use the co-condensation products of melamine, toluene sulfonamide, butanol and formaldehyde. The proportions of reactants may be varied between the limits of 1 mol of melamine to from 0.1 to 1.0 mol of toluenesulfonamide and from 1 to 6 or more mols of formaldehyde. An excess of the formaldehyde may be used. The toluenesulfonamide may be any of the isomeric ortho-, meta- or para-derivatives or it may be a mixture of two or more of the isomers.

To be used as a coating composition, the polyvinyl acetals, polyurethanes and melamine resins should be dissolved in a substantially anhydrous organic solvent medium. Any non-reactive volatile mutual solvents for the resinous components may be used, such as ethylene dichloride, trichloroethylene or mixed solvent systems of alcohols, esters and hydrocarbons. For the coating of magnet wire, the solvent medium preferably contains a substantial amount of a phenol such as phenol, cresols, xylenols, and an aliphatic or aromatic hydrocarbon such as xylene, naphtha and mixtures such as the high solvency petroleum hydrocarbons used in the examples. The particular naphtha hydrocarbon mixture used in the preceding examples for the preparation of the wire enamels is a mixture of aromatic liquid hydrocarbons of boiling range 150–184° C. derived from coal tar and/or petroleum. The cresylic acid that was used is a mixture of liquid phenolic compounds consisting primarily of xylenols and cresols and having a boiling range of 195–227° C.

The wire enamels of the present invention are stable indefinitely under usual storage conditions. The reaction initiates at temperatures of about 150° C. with the reaction proceeding more rapidly as the temperatures increase. In the commercial type wire towers generally employed for wire enameling, it is preferred to conduct the reaction at tower operating temperatures of approximately 300 to 450° C.

The resinous compositions of this invention form valuable insulative coatings both on magnet wire and in other applications such as for example, foil condensers. These coatings are smooth, glossy, tough, adhere well to metals, are resistant to solvents and abrasion, and are superior to conventional wire enamels in hermetic applications.

It is to be understood that the present invention is not limited to the particular wire coating compositions, applications or wire sizes described above. It is obvious from the above test results that it is possible to utilize the present coating compositions as the base coat on a wire and to apply as an overcoat one or more of the many compatible insulating varnishes and thereby obtain a coating acceptable at even higher operating temperatures. It is also obvious that the present enamels may be applied as the varnish over a base coat of less thermally resistant and solvent resistant coatings. Nor is it intended to limit the application of the resin as an electrical insulation for wire merely. The solid resinous constituents of the present invention are indefinitely stable as a dry mixture at room temperature. It is possible therefore by means of extrusion, dipping, casting and other known means to form insulation from such a mixture that is useful in such electrical applications as slot liners, encapsulation, sheet insulation, and surface coatings. The coating compositions shown can also be used as adhesives or impregnating varnishes for such articles as glass tapes and electrical coils. Other non-electrical uses of the compositions are apparent where chemical resistance and temperature stability of the final product are needed, such as surface coatings and others.

It will be obvious to the man skilled in the art from all of the above that other compositions and applications are within the scope of this invention.

What is claimed is:

1. A coating composition comprising an organic liquid solution of 100 parts of a polyvinyl acetal, 0.5–20 parts of a melamine-aldehyde condensate resin, 5–200 parts of a polyurethane consisting of the adduct of an organic polyisocyanate with a reactive hydrogen containing compound taken from the group consisting of phenols, secondary aromatic amines, alcohols, amides, lactams, mercaptans, enols and mixtures thereof, and 0.01–2 parts of a cure promoter selected from a class consisting of soluble metal organic compounds of tin and iron.

2. A coating composition as in claim 1 wherein the polyvinyl acetal is polyvinyl formal.

3. A coating composition as in claim 1 also containing 0.01–2 parts of a soluble tertiary amine.

4. A coating composition comprising an organic liquid solution of 100 parts of polyvinyl formal, 0.5–20 parts of a melamine-aldehyde condensate resin, 0.01–2 parts of a cure promoter selected from the class consisting of soluble metal organic compounds of tin and iron, and 5–200 parts of a polyurethane represented by the formula:

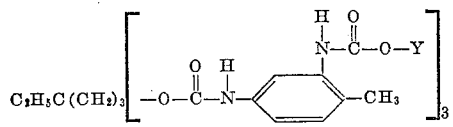

where Y is a member selected from the class consisting of phenyl, methylphenyl and dimethylphenyl groups.

5. A composition comprising the product of heating at temperatures over 150° C. 100 parts of a polyvinyl acetal, 0.5–20 parts of a melamine-aldehyde condensate resin, 5–200 parts of a polyurethane consisting of the adduct of an organic polyisocyanate with a reactive hydrogen containing compound taken from the group consisting of phenols, secondary aromatic amines, alcohols, amides, lactams, mercaptans, enols and mixtures thereof, and a cure promoter selected from the class consisting of soluble metal organic compounds of tin and iron.

6. A composition as in claim 5 wherein the polyvinyl acetal is polyvinyl formal.

7. A composition comprising the product of heating at temperatures over 150° C. 100 parts of polyvinyl formal, 1–10 parts of a melamine-formaldehyde condensate resin, 40–80 parts of a polyurethane consisting of the adduct of an organic polyisocyanate with a reactive hydrogen containing compound taken from the group consisting of phenols, secondary aromatic amines, alcohols, amides, lactams, mercaptans, enols and mixtures thereof, and 0.03–0.5 part of a cure promoter selected from the class consisting of soluble metal organic compounds of tin and iron.

8. A composition comprising the product of heating at temperatures over 150° C. 100 parts of polyvinyl formal, 1–10 parts of a melamine-formaldehyde condensate resin, 40–80 parts of a polyurethane consisting of the adduct of organic polyisocyanate with a reactive hydrogen containing compound taken from the group consisting of phenols, secondary aromatic amines, alcohols, amides, lactams, mercaptans, enols and mixtures thereof, 0.03–0.5 part of a cure promoter selected from the class consisting of soluble metal organic compounds of tin and iron and 0.03–0.5 part of a soluble tertiary amine.

9. A composition comprising the reaction product of heating at temperatures over 150° C. an organic liquid solution of solids in the proportions 100 parts of polyvinyl formal, 1–10 parts of a melamine-formaldehyde condensate resin, 0.03–0.5 part of a soluble cure promoter selected from a class consisting of soluble metal organic compounds of tin and iron, and 40–80 parts of a polyurethane by the formula:

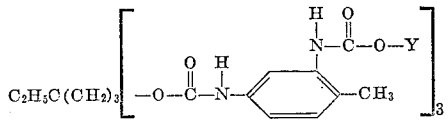

where Y is a member of the class consisting of phenyl, methylphenyl and dimethylphenyl groups.

10. A composition comprising the reaction product of heating at temperatures over 150° C. an organic liquid solution of solids in the proportion 100 parts of polyvinyl formal, 5 parts of a melamine-formaldehyde condensate resin, 0.05 part dibutyltin dilaurate, 0.05 part triethylenediamine, and 60 parts of a polyurethane represented by the formula:

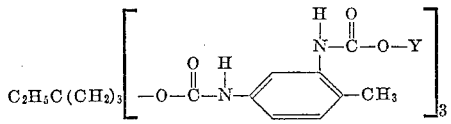

where Y is a member of the class consisting of phenyl, methylphenyl and dimethylphenyl groups.

11. A process for preparing a resinous composition which comprises heating above 150° C. an organic liquid solution containing solids in the proportion of 100 parts of polyvinyl formal resin, 0.5–20 parts of a melamine-aldehyde condensate resin, 5–200 parts of a polyurethane consisting of the adduct of an organic polyisocyanate with a reactive hydrogen containing compound taken from the group consisting of phenols, secondary aromatic amines, alcohols, amides, lactams, mercaptans, enols and mixtures thereof, and 0.1–2 parts of a cure promoter selected from a class consisting of soluble metal organic compounds of tin and iron.

12. A process for insulating wire which comprises coating the wire with an organic solution comprising 100 parts of polyvinyl formal, 0.5–20 parts of a melamine-aldehyde condensate resin, 5–200 parts of a polyurethane consisting of the adduct of an organic polyisocyanate with a reactive hydrogen containing compound taken from the group consisting of phenols, secondary aromatic amines, alcohols, amides, lactams, mercaptans, enols and mixtures thereof, and 0.01–2 parts of a cure promoter selected from the class consisting of soluble metal organic compounds of tin and iron, removing the solvent from the coating and curing the coating on the wire at temperatures over 150° C.

13. Electrical insulation comprising the product of heating at temperatures above 150° C. 100 parts of polyvinyl formal, 0.5–20 parts of a melamine-aldehyde condensate resin, 5–200 parts of a polyurethane consisting of the adduct of an organic polyisocyanate with a reactive hydrogen containing compound taken from the group consisting of phenols, secondary aromatic amines, alcohols, amides, lactams, mercaptans, enols and mixtures thereof, and 0.1–2 parts of a cure promoter selected from the class consisting of soluble metal organic compounds of tin and iron.

14. An electrical conductor insulated with an organic insulation comprising the product of heating at above 150° C. 100 parts of a polyvinyl formal, 0.5–20 parts of a melamine-aldehyde condensate resin, 5–200 parts of a polyurethane consisting of the adduct of an organic polyisocyanate with a reactive hydrogen containing compound taken from the group consisting of phenols, secondary aromatic amines, alcohols, amides, lactams, mercaptans, enols and mixtures thereof, and 0.1–2 parts of a cure promoter selected from the class of soluble metal organic compounds of tin and iron.

15. A coated electrical conductor consisting of a bare metal wire and a coating comprising the product of heating at temperatures above 150° C. 100 parts of polyvinyl formal, 0.5–20 parts of a melamine-aldehyde condensate resin, 5–200 parts of a polyurethane consisting of the adduct of an organic polyisocyanate with a reactive hydrogen containing compound taken from the group consisting of phenols, secondary aromatic amines, alcohols, amides, lactams, mercaptans, enols, and mixtures thereof, and 0.01–2 parts of a cure promoter selected from the class consisting of soluble metal organic compounds of tin and iron.

16. An electrically insulating varnish comprising the composition of claim 1.

References Cited in the file of this patent

UNITED STATES PATENTS

| 2,402,075 | Novotny et al. | June 11, 1946 |
| 2,409,548 | Debacher | Oct. 15, 1946 |
| 2,430,479 | Pratt et al. | Nov. 11, 1947 |
| 2,454,678 | Smith et al. | Nov. 23, 1948 |

FOREIGN PATENTS

| 594,001 | Great Britain | Oct. 30, 1947 |
| 206,454 | Australia | Feb. 20, 1957 |